Feb. 19, 1946.   J. E. BEVINS   2,394,974
ACCELEROMETER
Filed May 19, 1943   4 Sheets-Sheet 1
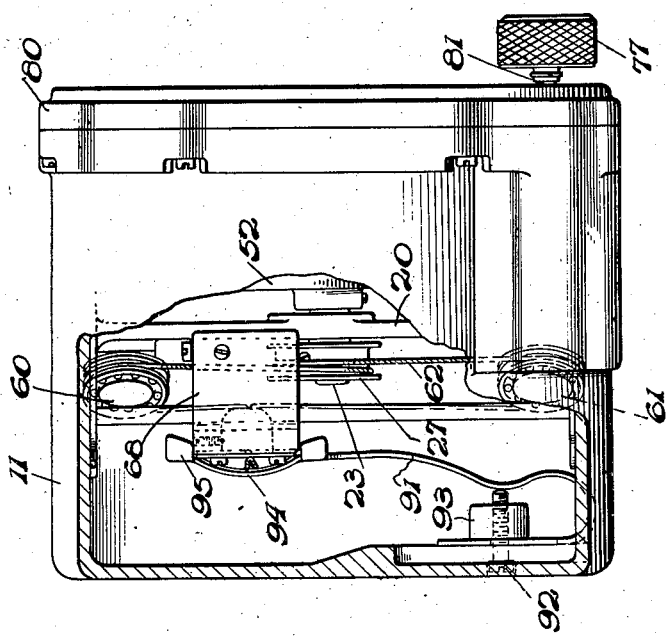
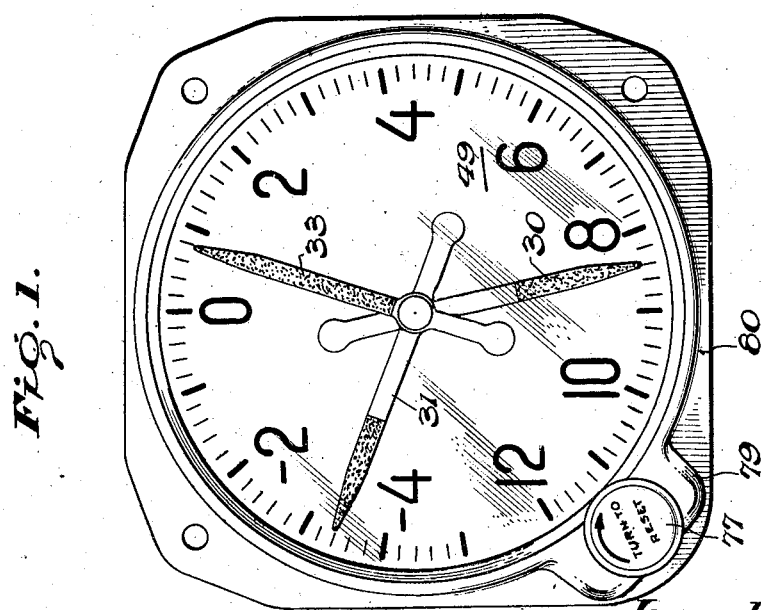
INVENTOR.
James E. Bevins
BY
Herbert M. Birch
Attorney Feb. 19, 1946. J. E. BEVINS 2,394,974
ACCELEROMETER
Filed May 19, 1943 4 Sheets-Sheet 2

INVENTOR.
James E. Bevins
BY
Herbert M. Birch
Attorney

Feb. 19, 1946.  J. E. BEVINS  2,394,974
ACCELEROMETER
Filed May 19, 1943    4 Sheets-Sheet 3
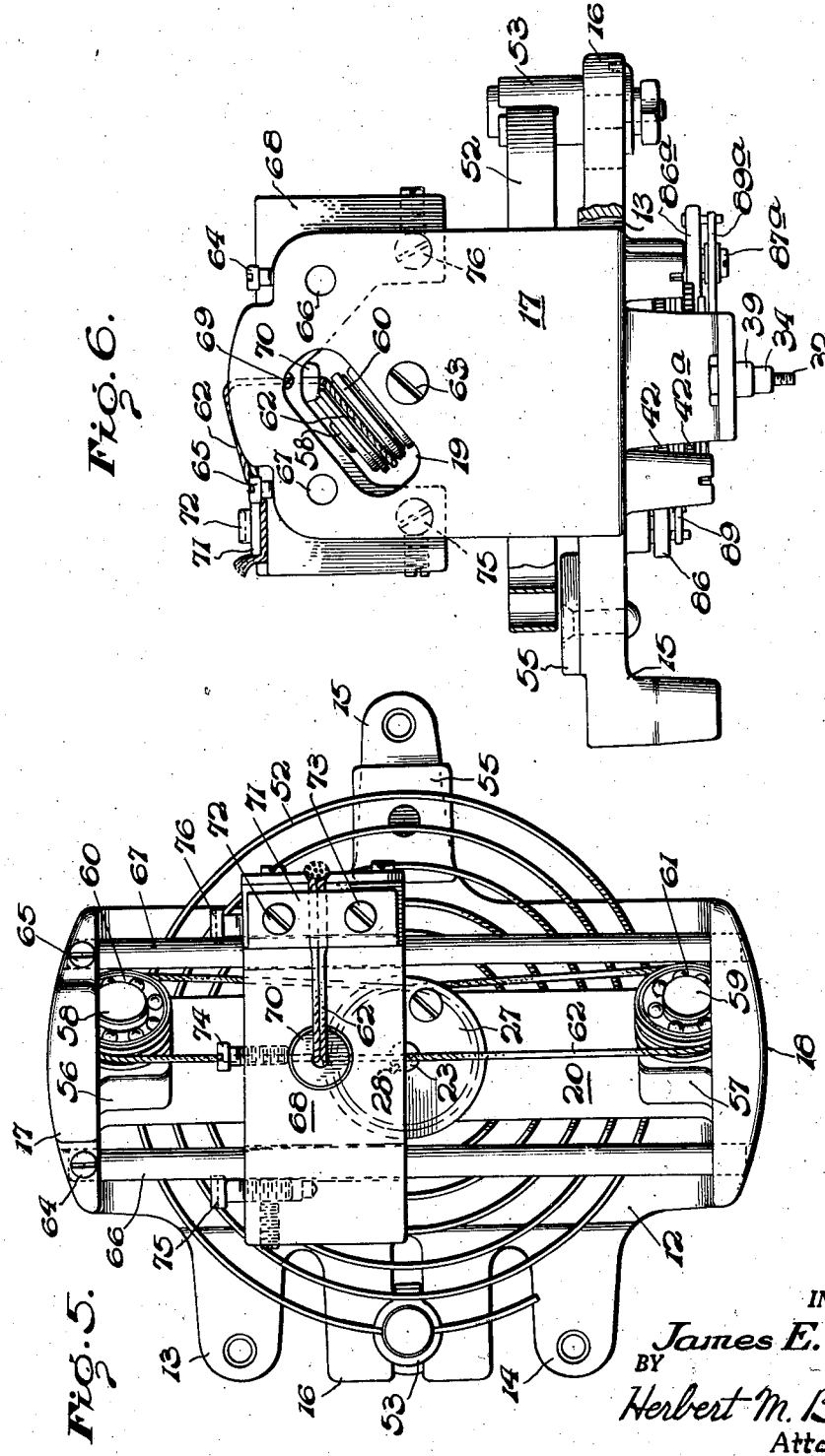
INVENTOR.
James E. Bevins
BY
Herbert M. Birch
Attorney

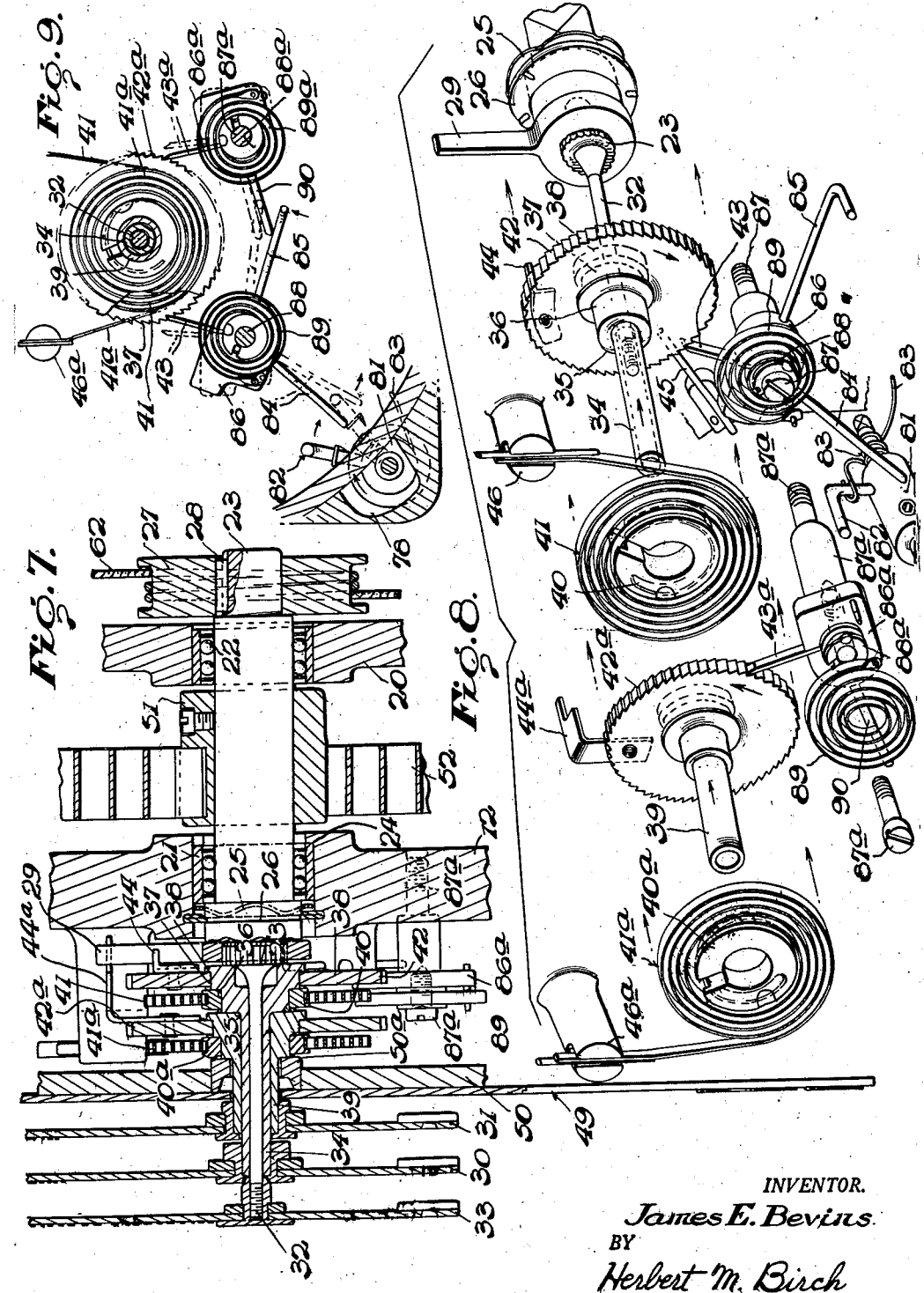

Patented Feb. 19, 1946

2,394,974

UNITED STATES PATENT OFFICE 2,394,974

ACCELEROMETER

James E. Bevins, Hackensack, N. J., assignor to Bendix Aviation Corporation, Bendix, N. J., a corporation of Delaware Application May 19, 1943, Serial No. 487,673

7 Claims. (Cl. 264—1)

This invention relates to accelerometers for aircraft and more particularly to an accelerometer embodying a plurality of mass motivated pointers for indicating positive and negative maximum indications together with instantaneous indications, responsive to gravitational influences derived from a pre-set movable mass having a relatively long range of movement, so the maximum pointers are not moved by normal vertical vibrations, but only by positive or negative accelerations.

Prior to the present invention, weight or mass actuated accelerometers required complicated damping mechanism to prevent normal vertical vibrational indications of the pointers, as this fault seriously impaired the accurate indication of material abnormal accelerated vertical indications. Such damping arrangements are not only complicated but prolong production, as it is extremely difficult to calibrate such arrangements, which include structural elements such as fly links, gears and pinions subject to wear and breakage from abnormal accelerations caused by diving and the like.

With the present device, it is a relatively simple matter to calibrate and set the weight or mass so as to eliminate the need of prior art damper mechanisms, because proper throw or length of mass movement may be adjusted or calibrated after the mechanism has been assembled by the simple process of temporarily hooking an auxiliary testing weight on the cable similar to the one to be permanently installed; the only step in assembly necessary after calibration being to insert the assembly into the shell or casing of the accelerometer.

Accordingly, one of the objects of this invention is to provide an accelerometer so constructed as to no longer need complicated damper mechanisms to damp out interfering vibrational indications.

Another object is the provision of a simplified device having no gears or pinions and the like subject to wear or breakage under excessive strain from sudden unusually rapid accelerations.

A further object is to provide a device of this class wherein no fly link is necessary because a spread of only 340° is covered by the maximum pointers instead of 360°.

Another object provides for more efficient calibration of the device to speed up plant production.

Yet another object is to provide a novel means for mounting an accelerometer weight so as to produce a relatively long throw before drive is imparted to the maximum pointer mechanism.

Yet another object is to provide a novel drive means operated from said weight movements adapted to drive a plurality of individually mounted pointers in either a clockwise or counter-clockwise direction to make either negative or positive indications in combination with an instantaneous indicating pointer.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention, reference for this latter purpose being had to the appended claims.

In the drawings wherein like reference characters refer to like parts throughout the several views;

Figure 1 is a front elevation view of the assembled device.

Figure 2 is a side elevation view partly in section.

Figure 5 is a rear elevation view of the frame.

Figure 6 is a plan view with a fragment of the main spring in cross section and with a lug broken away.

Figure 7 is an enlarged sectional elevation view, of a portion of Figure 4, of the device taken along the axis of the main drive shaft.

Figure 8 is an exploded perspective view of the indicator hand assemblies and their respective reset mechanisms.

Figure 9 is a detached front elevation view of the reset mechanism partly in section.

Figures 3, 4:
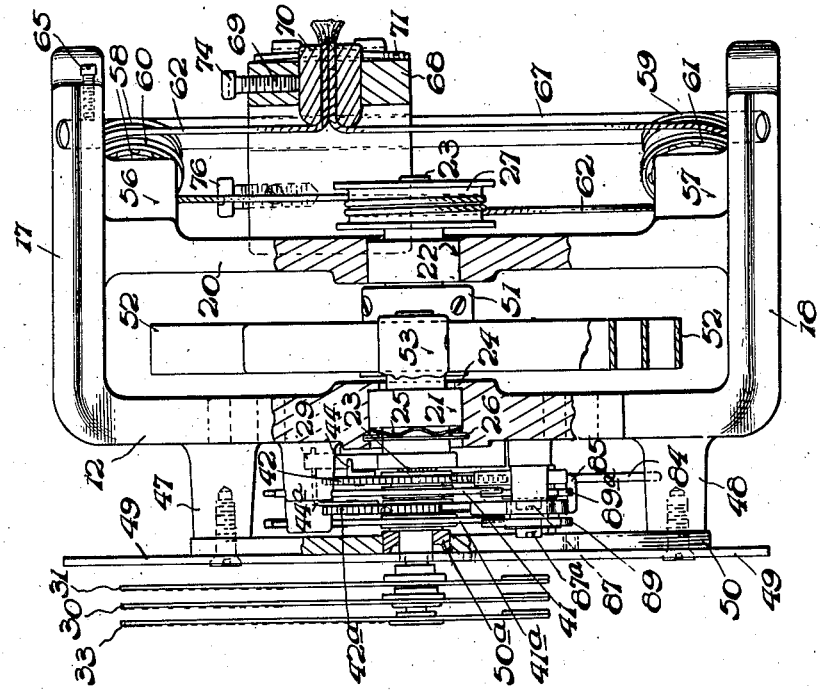
Figure 3 is a front elevation view of the frame without the casing.
Figure 4 is a side elevation view partly in cross section.

Referring to the drawings, in detail, in the illustrated embodiment of the invention, the device comprises a casing 11, a frame which may be cast or otherwise formed so as to have a flat plate member 12, see Figures 3 and 5, from which extends a plurality of lugs, as 13, 14, 15 adapted to secure the frame to the casing, and a slotted lug 16 for the purpose hereinafter described. Two flat outer frame bars 17 and 18, shown in Figure 4 continue from each end of plate 12 substantially perpendicular with respect thereto. The generally horizontal bars 17 and 18 are provided with arcuate outer surfaces to facilitate a complementary fit within a casing 11. The plate top bar 17 of the frame contains an elongated opening 19, see Figure 6, angularly disposed towards the rear edge of the bar for a purpose hereinafter set forth.

Extending between bars 17 and 18 in spaced parallel relation to plate 12 is a flat vertical bar 20. Plate 12 and bar 20 are provided intermediate their ends with axially aligned bearing openings adapted to receive and house bearing members 21 and 22, if desired of ball bearing type, associated with a main driven shaft 23 disposed in the frame parallel to outer frame bars 17 and 18.

The driven shaft 23 is secured against axial thrust by mounting bearing 21 in the bearing opening of plate 12 against annular shoulder 24 and locking the same therein by corrugated washer 25 and split ring 26 adapted to snap into an annular groove in the bore of the bearing opening. The corrugations of washer 25 permit slight axial resiliency, but prohibit any appreciable axial movement.

The main driven shaft 23 extends through to the outside or front flat face of plate 12 and bar 20. The extremity of shaft 23 outside of plate 12 carries an improved pointer or indicator mounting and operating assembly, while the other or rear extremity of the shaft has mounted thereon a drum pulley 27, by any suitable means such as a key 28, in Figure 7.

Specifically referring to Figure 7, the improved indicator assembly, shaft 23, as it projects from the plate 12, carries a lever 29, splined or otherwise secured, adapted to revolve in either a clockwise or counter-clockwise direction to selectively operate the maximum indicator members 30 and 31 through their associated parts. The associated parts for each maximum indicator member co-acting with the lever 29 are substantially the same in construction and detailed reference to one set of parts therefore will describe both.

Accordingly, leading up to such detailed reference, the shaft 23 has a reduced shaft or extremity 32 continuing from lever 29 to the exposed tip end on which is secured an instantaneous indicator hand 33. Freely mounted around reduced shaft 32 is a tubular shaft or elongated sleeve 34, to the exposed tip end of which is secured a maximum indicator hand 30. Tubular shaft 34 has an enlarged stepped annular end adjacent lever 29, so as to provide annular surfaces 35, 36, and 37. The annular surface 37 is provided with an anchoring shoulder 38.

Each of the annular surfaces supports a cooperating part. Elongated annular surface 35 has freely mounted thereon an identically formed tubular shaft 39 of less length than surface 35, so as to expose the end portion of the shaft 34. Surface 36 is associated with a split collar 40 (see Figure 8) secured thereto, collar 40 holding the inner coiled end of winding spring 41. Surface 37 is associated with ratchet wheel or disk 42 in mesh with a pawl 43, shown in Figures 8 and 9, and carries a pin 44 near its peripheral edge adapted to be acted upon by lever 29.

Also, in the arc of travel of pin 44 is positioned a stop 45, see Figure 8, adapted to prevent rotation of disk 42 beyond a predetermined point.

The spring 41 has its outer coil end anchored in forward projecting split stud 46 mounted on plate 12 (see Figures 3 and 8), so that clockwise rotation, transmitted from ratchet wheel 42, winds the spring 41 about split collar 40.

The tubular shaft 39 is provided with similar annular surfaces 35, 36 and 37, described in connection with shaft 34, and each annular surface carries a similar corresponding part, as indicated by numerals 40a, 41a, 42a, in Figure 8. L-shaped pin 44a is adapted to coact generally similarly to pin 44 with lever 29 but for the opposite direction of movement of said lever. To permit such coaction, pin 44a is made longer than pin 44 and shaped to contact the opposite edge of lever 29.

Extending forwardly from plate 12 are spacer lugs 47 and 48, see Figure 4, to which is secured a flat bar 50 and an indicating dial 49 traversed by the indicator members and marked to provide readings in g's (units of gravity) of the positive or negative accelerations being applied along the vertical axis of the airplane carrying the device. The dial 49 has a centrally disposed opening in alignment with a relatively large opening in bar 50 which has a bushing 50a secured therein, through which project the ends of the three indicator hand shafts previously described. Obviously, the indicator hands are thus in position to turn around the dial to various readings in g's.

Secured between plate 12 and bar 20 to main driven shaft 23 at the inner coil end (see Figure 7) by a sleeve 51 secured on the shaft is a coil spring 52 which is secured at the outer end of the coil by a bolt and split sleeve fastener 53 (see Figures 3 and 4), secured within the elongated slot of lug 16. Spring 52 is so set as to retain the indicator hands and a weight, hereinafter described, normally in a neutral or inoperative position. Lateral displacement of the spring coils is limited by block 55, shown in Figure 6 secured to plate 12 adjacent one side of the outer coils.

Above and below drum pulley 27 and disposed from bar 20 at its point of junction with top and bottom frame bars 17 and 18 are lugs 56 and 57 respectively (see Figure 4), in each of which are respectively secured pulley axles or shafts 58 and 59.

Pulleys 60 and 61, which may be ball bearing type, are freely mounted on the shafts 58 and 59 for rotation (see Figure 2), pulley 60 being visible through angular slot 19 in top bar 17 (see Figure 6), said slot being sufficiently large to permit shaft 58 and pulley 60 to laterally move into alignment with the slot for adjustment of cable 62 on the pulley upon release of set screw 63. The axes of shafts 58 and 59 are angularly disposed with respect to the plane of the axis of the main shaft 23, that carries drum pulley 27 to prevent tangle or slack caused by overlapping cable and provide for a straight pull and even coiling of cable 62 around the drum surface of pulley 27.

In the outer end of each bar 17 and 18, secured by set screws 64 and 65 (see Figures 4-6), are the vertical parallel guide rods 66 and 67, preferably spaced farther apart than the overall diameter of pulley 27 and the outer peripheral edges of the pulleys 60 and 61. The proportional spacing of guide rods 66 and 67 with respect to the foregoing elements is important for the proper installation of the mass or weight 68.

The mass or weight 68 is designed to be a maximum for a minimum amount of cubic space. To provide for this, the mass is cast or cut out at the side adjacent the cable pulleys in a generally V-shaped well portion 69 so shaped and so proportioned, as to clear the pulleys 27, 60 and 61 during operation (see Figure 6).

Centrally disposed and projecting through the mass or weight 68 to the vertex of well 69 is a bushing 70 through which driving cable 62 is threaded, strung across weight 68 and secured under plate 71, held in place by bolts 72 and 73.

The bushing 70 is held in place by set screw 74. Also, adjustably positioned in each top edge of weight 68 are stop bolts 75 and 76 adapted to limit upward thrust of the weight by contact with top bar 17.

During operation of the present device the instant, i. e., instantaneous valve, hand 33 moves in either direction and returns to neutral or zero position promptly in response to the tension of spring 52 when accelerated vertical impulses cease, but the maximum hands 30 and 31 as they turn respectively wind springs 41 and 41a and are locked in their furthermost positions by their respective pawl and ratchet mechanisms. Hand 30 is locked by spring pressed pawl 43 engaging ratchet wheel 42 and hand 31 is locked in the same manner by the reversely rotated ratchet wheel 42a and spring pressed pawl 43a, whereupon, after a specific series of indications are finished, the hands 30 and 31 must be released and reset to normal position for the next dive and pull-out.

An arrangement accordingly is provided to simultaneously release both novelly mounted pawls 43 and 43a from the teeth of the ratchet wheels to reset the hands. Referring to Figures 1, 2, 3, and 9 the reset or release mechanism comprises a knob 77, a chamber 78 in an enlarged off-set portion 79 in bezel 80 and a shaft 81 projecting through bezel 80 and chamber 78. Bezel 80 is secured to casing 11 in any suitable manner, so that enlarged part 79 lines up with an inwardly extending portion of the flange of casing 11 through which extends shaft 81. The shaft 81 has a lug 82 pointing towards the front of the casing secured on shaft 81 and normally held inoperative against the wall of chamber 78 by a spring 83. Shaft 81 projects inwardly through the flange of casing 11 at such a point that lug 82 extends into the casing between dial 49 and plate 12. Adjacent and within the radial throw of lug 82 is a bell-crank lever with arms 84 and 85 depending from a spring anchor plate 86, which plate is journalled to plate 12 by suitable means, as bolt 87, and a split collar 88 to hold the inner coil end of spring 89 and pawl 43.

The resetting mechanism herein disclosed is claimed in my copending application bearing Serial No. 599,001, filed on June 12, 1945.

*Operation*

In reference to one feature of operation it should be noted that the maximum indicator hands in the present disclosure are directly operated by a lever 29 through a pin 44 carried by one hand operating ratchet disk 42 adapted to rest against one edge of the lever and through an L-shaped pin 44a carried by the other maximum hand operating disk 42a adapted to rest against the opposite edge of lever 29.

Spring 89 has its outer coil end anchored to plate 86 and its inner coil end anchored to split collar 88, that carries pawl 43, pivoted on bolt 87, so as to normally press the pawl into engagement with ratchet wheel 42. As the ratchet wheel 42 rotates, spring 41 winds up on shaft 34.

Arm 84 is in the line of travel of lug 82 and arm 85 extends across plate 12 into contact with an arm 90 depending from the twin spring anchor plate 86a mounted on bolt 87a, which is slightly longer than bolt 87. Split collar 88a, pawl 43a and spring 89a are secured to the plate 86a in the same manner described as in connection with plate 86.

In specific operation, assume the device to be properly installed in an aircraft in flight along a straight path when suddenly it becomes essential to dive the craft, whereupon the plane and crew are subjected to increasing stress with the rapidity of pull-out and may be acted on by an accelerational force many times greater than that, due to gravitation, normally along the vertical axis of the craft.

Immediately that the pilot dives, weight 68 is acted upon by positive vertical accelerations, so that cable 62 is pulled about pulleys 60, 61 and 27, whereupon main shaft 23 is rotated in a clockwise direction (Figure 5) and instantaneous indicator hand 33 carried by reduced shaft 32 is moved to give constant positive readings in units of gravity. Directly following actuation of the instant indicator hand, motion is transmitted through pin 44 to disk 42, whereupon maximum positive indicator hand 30 sweeps forward clockwise about the dial, winds spring 41 around surface 36, and is held set to its furthermost position by pawl 43 engaging ratchet disk 42, until the pilot pulls out of the dive; whereupon the instant hand 33 returns past zero point and instantly begins to give negative indications while the maximum indicator hand 30 remains set at such maximum positive indication.

Thus, when the pilot comes out of a dive, the weight 68 moves along guides 66 and 67 in the opposite direction for negative indication, the chain of operation being identical to that just described with the exception that lever 29 moves ratchet disk 42a through L-shaped pin 44a in a reverse direction, so as to tend to actuate maximum hand 31 in a counter-clockwise direction, until the pilot levels off.

To reset the maximum indicator hands 30 and 31, knob 77 is manually rotated, shaft 81 rotates against spring 83 and lever 82 strikes arm 84 and rotates plate 86 against the action of spring 89 and releases pawl 43. Simultaneously with this operation, arm 85 lifts arm 90 and similarly releases pawl 43a and the maximum hands return to zero under the unwinding action of springs 41a and 41.

In Figure 2, is illustrated a weight holder comprising a flat spring 91 having one end bifurcated (not shown) and secured to the back of casing 11 by a stud 93, adapted to normally be in a retracted position against the casing wall. The spring 91 is provided at the top with an enlarged claw head 94 and a plurality of lugs 95 adapted to engage around the weight when the spring is forced forward by a bolt 92 passing through the casing 11 and the stud 93 to hold the weight for shipping the device.

To illustrate an advantage of this instrument, when a dive approaches some predetermined value, the pilot knows it is time to pull out, as during pull-out a gravitational force of from 1 to 12 times normal must be overcome, and it is necessary for the pilot to know whether or not his plane and crew can stand such an increase in force.

The duration of the acceleration is generally so small that it would be impossible for the pilot to read the instrument during this maneuver and therefore he must read the maximum and minimum hands after the maneuver has been completed. By associating his sensations and actions and readings of airspeed and altitude during the dive with the accelerometer reading when the dive is completed, the pilot can predict and control the acceleration imposed on the aircraft.

Such terrific force increase not only acts upon the plane and crew, but also upon the instruments in the plane and the elimination of prior art damper structures employing gears and linkages, that break under such extreme gravitational force is a particularly valuable feature of the present device.

There is thus provided a novel improved and simplified accelerometer structure which may be easily and quickly calibrated, and one in which complicated damping mechanisms are eliminated and rendered unnecessary, and whereby no gears or pinions are required in the actuating mechanism between the indicating pointers and the acceleration responsive mass.

While only one embodiment of the invention has been illustrated and described, various changes and modifications, which will now appear to those skilled in the art, may be made without departing from the scope of the invention. Reference is therefore to be had to the appended claims for a definition of the limits of the invention.

What I claim is:

1. An endless cable drive mechanism for aircraft accelerometers, including cable power transmitting means responsive to positive and negative vertical movements of an aircraft with respect to the normal flight path, cable guide pulleys disposed adjacent the limit point of movement of said transmitting means, a cable joined together in said transmitting means, and a relatively larger driven pulley having its axis angularly disposed in a plane between and parallel to the axes of said guide pulleys with said cable looping and feeding around said driven pulley in coils so that the strands of the cable are in helical coil form whereby said driven pulley may be rotated in either a clockwise or counterclockwise direction.

2. An endless cable drive mechanism for aircraft accelerometers, including cable power transmitting means responsive to positive and negative movements of an aircraft with respect to the normal flight path, cable guide pulleys disposed adjacent the limit points of movement of said transmitting means, a cable joined together in said transmitting means, a relatively larger driven pulley having its axis angularly disposed in a plane between and parallel to the axes of said guide pulleys with said cable looping and feeding around said driven pulley in coils so that the strands of the cable are in helical coil form whereby said driven pulley may be rotated in either a clockwise or counterclockwise direction, said cable power transmitting means including a weighted member to which said cable is fixed, said member being provided with a longitudinal recess to permit movement of said member past said driven pulley, and guides for said member arranged to be parallel with each other and substantially parallel with, and in the same plane as, the path of travel of the straight portions of the cable connected to said member and between the guide pulleys.

3. An endless cable drive mechanism for aircraft accelerometers, including cable power transmitting means responsive to positive and negative vertical movements of an aircraft with respect to the normal flight path, cable guide pulleys disposed adjacent the limit points of movement of said transmitting means, a cable joined together in said transmitting means, and a driven pulley disposed between said guide pulleys with said cable wrapped around said driven pulley, whereby said driven pulley may be rotated in either direction by said cable.

4. An endless cable drive mechanism for aircraft accelerometers, including cable power transmitting means responsive to positive and negative vertical movements of an aircraft with respect to the normal flight path, said transmitting means including a weighted member, guides for said weighted member arranged to be parallel with each other, cable guide means disposed adjacent the limit points of movement of said weighted member, a cable joined together and fixed to said weighted member, and a driven pulley disposed between said guide pulleys with said cable wrapped around said driven pulley whereby said driven pulley may be rotated in either direction by said cable, said weighted member being provided with a longitudinal recess to permit movement of said member past said driven pulley.

5. In an accelerometer, the combination comprising a cable power transmitting means responsive to positive and negative vertical movements of an aircraft with respect to the normal flight path, cable guide pulleys disposed adjacent the limit point of movement of said transmitting means, a cable joined together in said transmitting means, a relatively larger driven pulley having its axis angularly disposed in a plane between and parallel to the axes of said guide pulleys with said cable looping and feeding around said driven pulley in coils so that the strands of the cable are in helical coil form whereby said driven pulley may be rotated in either a clockwise or counterclockwise direction, and indicating means driven by said driven pulley to show the direction and extent of movement of said transmitting means.

6. In an accelerometer, the combination comprising, a cable power transmitting means, responsive to positive and negative vertical movements of an aircraft with respect to the normal flight path, cable guide pulleys disposed adjacent the limit points of movement of said transmitting means, a cable joined together in said transmitting means, a driven pulley disposed between said guide pulleys with said cable wrapped around said driven pulley, whereby said driven pulley may be rotated in either direction by said cable, and indicating means driven by said driven pulley to show the direction and extent of movement of said transmitting means.

7. In an accelerometer, the combination comprising a cable power transmitting means responsive to positive and negative vertical movements of an aircraft with respect to the normal flight path, said transmitting means including a weighted member, guides for said weighted member arranged to be parallel with each other, cable guide means disposed adjacent the limit points of movement of said weighted member, a cable joined together and fixed to said weighted member, a driven pulley disposed between said guide pulleys with said cable wrapped around said driven pulley whereby said driven pulley may be rotated in either direction by said cable, said weighted member being provided with a longitudinal recess to permit movement of said member past said driven pulley, and indicating means driven by said driven pulley to show the direction and extent of movement of said weighted member.

JAMES E. BEVINS.